T. BELL.
Water-Elevators.
No. 138,312.　　　　　　　　　　Patented April 29, 1873.
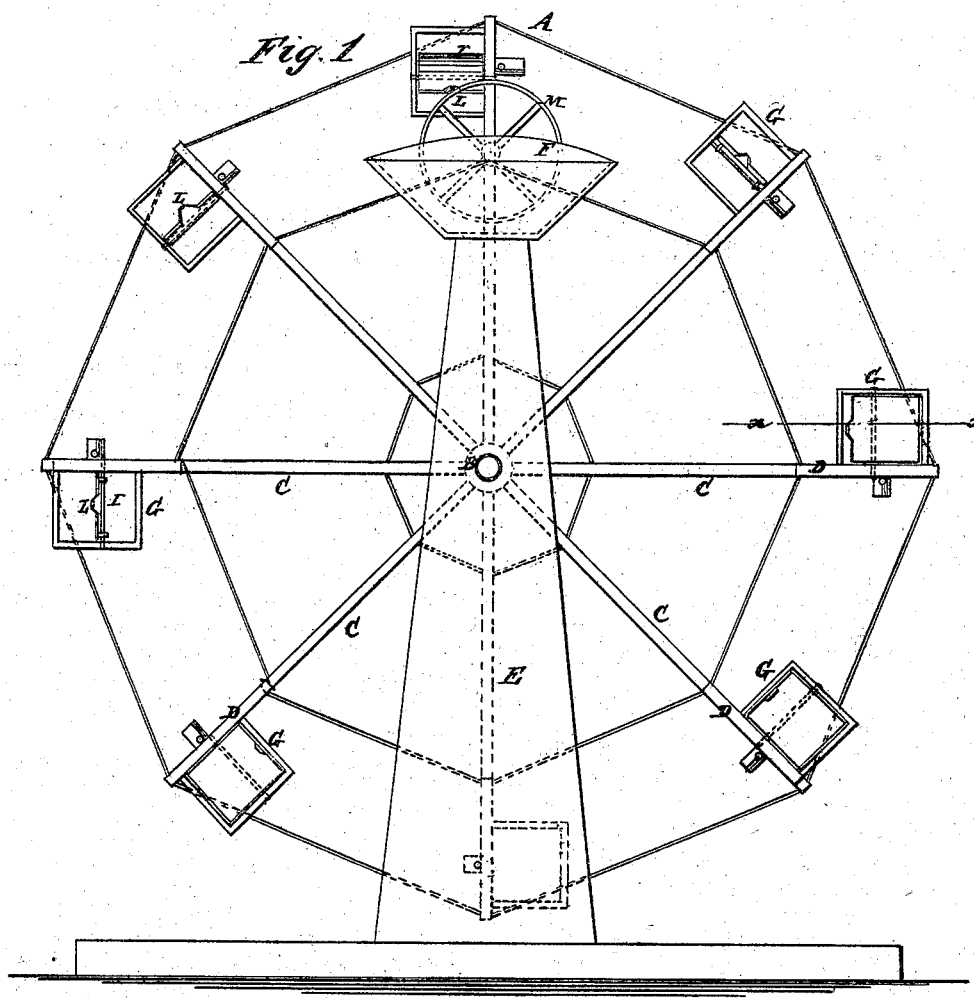
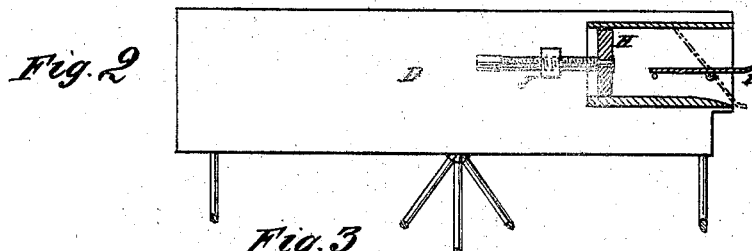
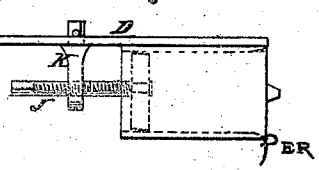
Witnesses:　　　　　　　　　　Inventor:

UNITED STATES PATENT OFFICE.

THOMAS BELL, OF BELLPORT, NEW YORK.

IMPROVEMENT IN WATER-ELEVATORS.

Specification forming part of Letters Patent No. 138,312, dated April 29, 1873; application filed January 25, 1873.

*To all whom it may concern:*

Be it known that I, THOMAS BELL, of Bellport, in the county of Suffolk and State of New York, have invented a new and useful Improvement in Water-Elevator, of which the following is a specification:

The invention consists in the improvement of water-elevators, as hereinafter described, and pointed out in the claim.

In the accompanying drawing, Figure 1 is an end elevation. Fig. 2 is a side view of one of the blades, showing the bucket in section taken on the line $x$ $x$. Fig. 3 is an edge view of the blade, giving another view of the bucket.

Similar letters of reference indicate corresponding parts.

A is the elevating-wheel, through the center of which is a shaft, B, having arms C and blades or paddles D. E represents a pillar at each end of the shaft, by means of which the wheel is supported. These pillars or stands are made partly of masonry and partly of wood. F is the receiving vessel or tank, into which the water is poured, and which is supported on one of the pillars E. The blades D (one or more) are provided with a bucket, G, fastened to the back side, as seen in the drawing. This bucket is a simple box having an adjustable head, H, in one end and a valve, I, in the other end. The head H is adjusted in the bucket by means of the screw J, which screw works through the stud K as through a nut. The position of the head governs the quantity of water taken in by the bucket. The valve I is hung on pivots removed from the center of the valve, so that the latter will be self-closing when the bucket is filled and raised from the water, and will be kept closed by the pressure of the water within. The wheel is revolved by the action of the water on the blades, and is arranged so that the buckets will be submerged at the lowest point and be filled, the valve being opened for filling by the pressure of the water, and closed by its own gravity and the pressure of water within when leaving the water, as before described. When the bucket thus filled with water reaches a point near the top of the wheel the lug L on the edge of the valve strikes the periphery of the wheel M, which opens the valve and discharges the water into the receiving-vessel F.

Having thus described my invention, I claim as new and desire to secure by Letters Patent—

1. A box-bucket, G, having a valve in one end and an adjustable head, H, at the other, as described, so as to graduate the quantity of water lifted to the varying force of tide or current.

2. The arrangement of water-carrying buckets G on the propelling paddles D of a wheel, as and for the purpose set forth.

THOS. BELL.

Witnesses:
T. B. MOSHER,
ALEX. F. ROBERTS.